US011941990B2

(12) United States Patent
Tomizawa et al.

(10) Patent No.: US 11,941,990 B2
(45) Date of Patent: Mar. 26, 2024

(54) BUS DISPATCH DEVICE, BUS DISPATCH METHOD AND BUS DISPATCH COMPUTER PROGRAM

(71) Applicant: TOYOTA JIDOSHA KABUSHIKI KAISHA, Toyota (JP)

(72) Inventors: Ryota Tomizawa, Susono (JP); Shozo Takaba, Chiryu (JP); Ayako Shimizu, Numazu (JP); Hojung Jung, Shizuoka-ken (JP); Daisuke Sato, Toyota (JP); Yasuhiro Kobatake, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 234 days.

(21) Appl. No.: 17/700,723

(22) Filed: Mar. 22, 2022

(65) Prior Publication Data

US 2022/0327934 A1 Oct. 13, 2022

(30) Foreign Application Priority Data

Apr. 12, 2021 (JP) ................................ 2021-067303

(51) Int. Cl.
*G08G 1/00* (2006.01)

(52) U.S. Cl.
CPC ............ *G08G 1/202* (2013.01); *G08G 1/207* (2013.01)

(58) Field of Classification Search
CPC ............................... G08G 1/202; G08G 1/207
See application file for complete search history.

(56) References Cited

FOREIGN PATENT DOCUMENTS

| | | |
|---|---|---|
| JP | 2004-234469 A | 8/2004 |
| JP | 2005-112321 A | 4/2005 |
| JP | 2011-107792 A | 6/2011 |
| JP | 2013-152516 A | 8/2013 |
| JP | 2017-167983 A | 9/2017 |
| JP | 2020-021166 A | 2/2020 |
| JP | 2021-051431 A | 4/2021 |

*Primary Examiner* — Mathew Franklin Gordon
(74) *Attorney, Agent, or Firm* — Dinsmore & Shohl LLP

(57) ABSTRACT

A bus dispatch device includes a vehicle dispatch unit that determines, based on external environment information, a ratio between various classes of in-service buses having different states of a specific amenity.

8 Claims, 8 Drawing Sheets

BUS DISPATCH DEVICE, BUS DISPATCH METHOD AND BUS DISPATCH COMPUTER PROGRAM

CROSS-REFERENCE TO RELATED APPLICATION

This application claims priority to Japanese Patent Application No. 2021-067303 filed on Apr. 12, 2021 incorporated herein by reference in its entirety.

BACKGROUND

1. Technical Field

The present disclosure relates to a bus dispatch device, a bus dispatch method, and a bus dispatch computer program.

2. Description of Related Art

A bus service control system that dispatches buses in response to a user's riding request is known (see, for example, Japanese Unexamined Patent Application Publication No. 2004-234469 (JP 2004-234469 A)).

SUMMARY

However, J P 2004-234469 A fails to disclose or teach a dispatch service in which any one of buses of different classes may be allocated to transport a user. For example, two classes of buses may be prepared: a bus having a specific amenity and a bus not having the specific amenity. In this case, a proportion of users who want to board a specific bus varies depending on the external environment, and thus users may be inconvenienced if the ratio between the different classes of in-service buses is always constant.

Considering the challenges stated above, the present disclosure is intended to enable appropriate dispatch of several classes of buses with different states of a specific amenity according to the needs of users.

The gist of the present disclosure is as follows.

A bus dispatch device according to a first aspect of the present disclosure includes a vehicle dispatch unit configured to determine, based on external environment information, a ratio between various classes of in-service buses having different states of a specific amenity.

In the first aspect, the bus dispatch device may further include an information provision unit configured to provide a user with information on a state of the specific amenity for the in-service bus.

In the first aspect, the information provision unit may provide the information to the user through a display device installed at a bus stop.

In the first aspect, the information provision unit may provide the information to the user through a user terminal owned by the user.

In the first aspect, the vehicle dispatch unit may determine a ratio of the number of in-service buses of a first class having the specific amenity to the number of in-service buses of a second class not having the specific amenity, based on the external environment information.

In the first aspect, the vehicle dispatch unit may calculate a predetermined parameter using a classifier, which is learned in advance to output the predetermined parameter from the external environment information, and determine, based on the predetermined parameter, the ratio between the various classes of in-service buses having different states of the specific amenity.

A bus dispatch method according to a second aspect of the present disclosure includes determining, based on external environment information, a ratio between various classes of in-service buses having different states of a specific amenity.

A bus dispatch computer program according to a third aspect of the present disclosure causes a computer to determine, based on external environment information, a ratio between various classes of in-service buses having different states of a specific amenity.

With each aspect of the present disclosure, it is possible to enable appropriate dispatch of several classes of buses with different states of a specific amenity according to the needs of users.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described with reference to drawings. In the following description, similar components are allocated the same reference number.

First Embodiment

Hereinafter, a first embodiment of the present disclosure will be described referring to FIGS. 1 to 6.

Figure 1:
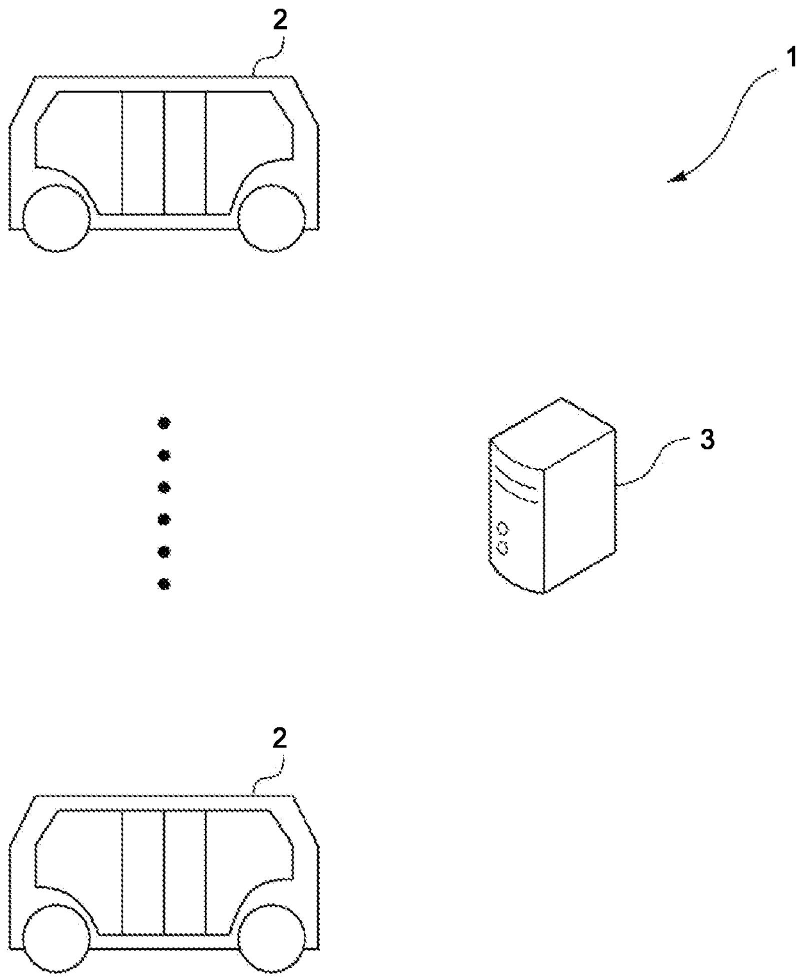
FIG. 1 is a diagram schematically illustrating a configuration of a bus dispatch center.

FIG. 1 is a diagram schematically illustrating a configuration of a bus dispatch center 1. The bus dispatch center 1 includes a plurality of buses 2 used for transporting users, and a server 3. The server 3 is one example of a bus dispatch device for enabling bus dispatch.

The bus 2 has a plurality of seats and can transport a plurality of users (passengers). In the present embodiment, the bus 2 is a fixed-route bus in which the bus 2 travels on a predetermined service route. That is, the bus 2 stops at each bus stop on the service route for the users to board and alight. The bus 2 is parked in the bus dispatch center 1 before service, and the bus dispatch center 1 functions as a standby place for the bus 2.

When the transportation service using the bus 2 is provided, the user selects the most suitable bus 2 according to the destination. The bus 2 is used by a wide variety of passengers. Consequently, there are various needs for the bus 2 used for the transportation service. However, mounting a plurality of amenities for satisfying various needs on each bus 2 greatly increases the cost of the transportation service. Functions of the specific amenity may inconvenience some users. Therefore, in the present embodiment, several classes of buses having different states of a specific amenity will be adopted as the bus 2 used for the transportation service. This solution can increase user satisfaction with the transportation service while using the bus 2.

For example, two classes of buses that have or do not have a specific amenity are arranged, that is, a first class of bus provided with the specific amenity and a second class of bus not provided with the specific amenity. Such a specific amenity is, for example, a pollen remover for removing pollen. In this case, the bus of the first class is provided with the pollen remover, and the bus of the second class is not provided with the pollen remover. Users who have hay fever can alleviate symptoms thereof by choosing the first class of bus. On the other hand, users who are inconvenienced by the function of removing pollen can select the second class of bus. Therefore, it is possible to increase user satisfaction with the transportation service by providing two such classes of buses.

Figure 2:
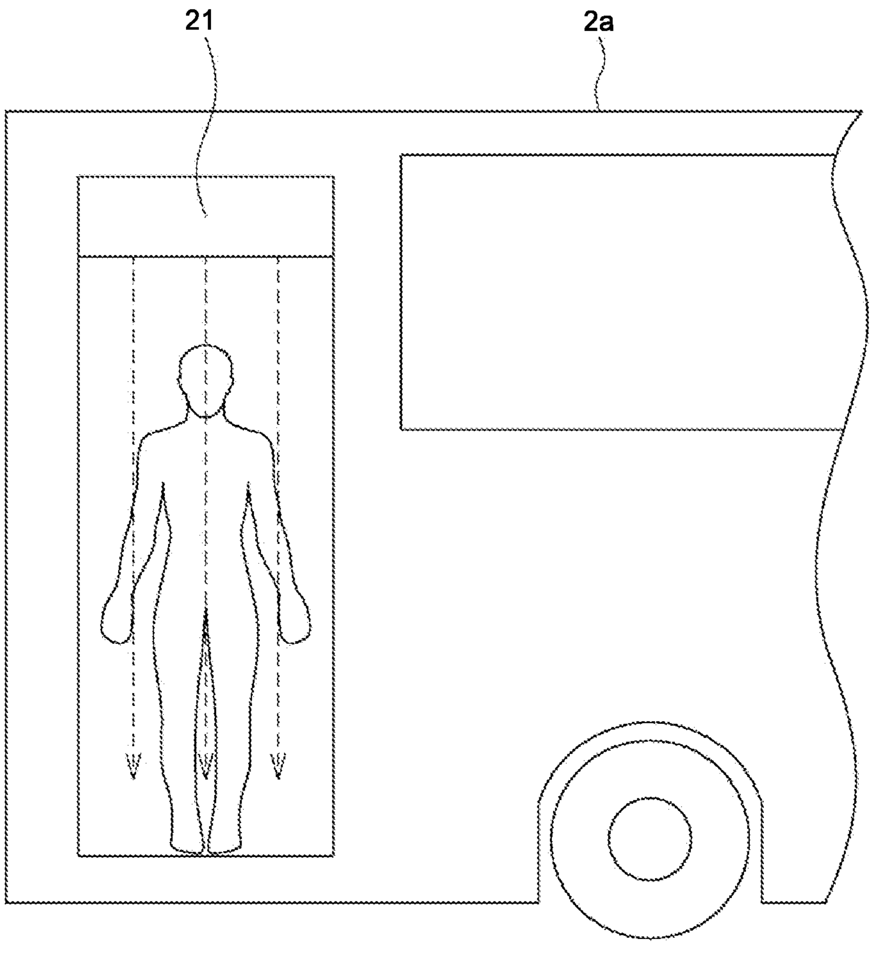
FIG. 2 is a diagram schematically illustrating one example of a bus provided with a pollen remover.

FIG. 2 is a diagram schematically illustrating one example of the bus provided with the pollen remover. In a bus 2*a* shown in FIG. 2, the pollen remover configured as an air ejector 21 is arranged above an entrance of the bus 2*a*. The air ejector 21 has a fan operated by electric power, and injects air taken into a vehicle compartment toward the user boarding the bus 2*a*. That is, the air ejector 21 functions as an air shower. Accordingly, pollen adhering to, for example, the user's clothes is removed by air flow. In the example of FIG. 2, as shown by broken lines, the air ejector 21 injects air from above to below. The air ejector 21 may be configured to inject air in a horizontal direction. Further, a known air purifier may be arranged in the bus as the pollen remover. In this case, for example, a plurality of air purifiers are arranged at different positions in the vehicle compartment of the bus.

Figure 3:
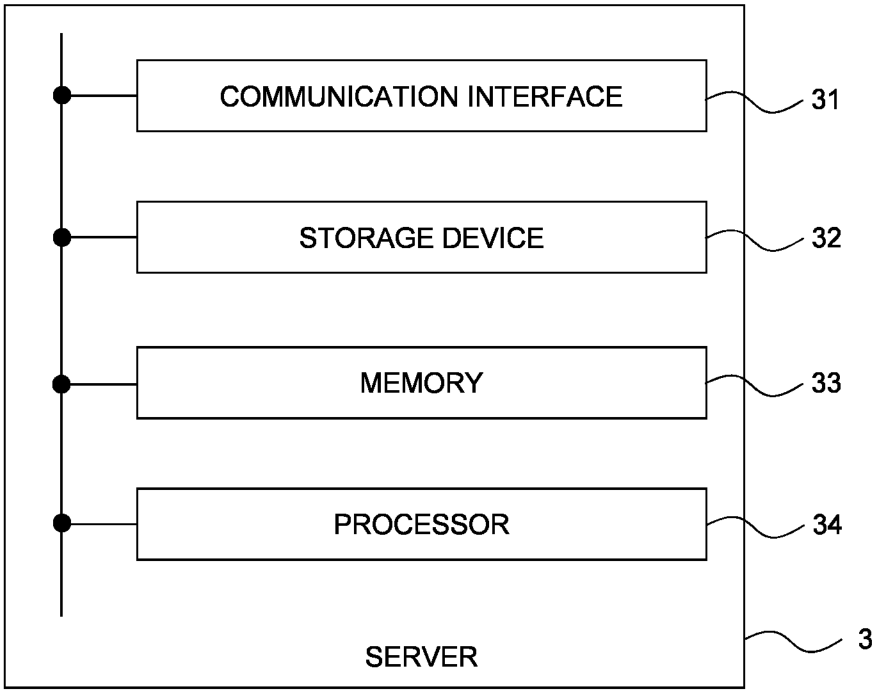
FIG. 3 is a diagram schematically illustrating a configuration of a server.

A server 3 will be described hereinbelow. FIG. 3 is a diagram schematically illustrating a configuration of the server 3. The server 3 includes a communication interface 31, a storage device 32, a memory 33, and a processor 34. The communication interface 31, the storage device 32, and the memory 33 are connected to the processor 34 via signal lines. The server 3 may further include an input device such as a keyboard and a mouse, and an output device such as a display. Moreover, the server 3 may be configured as a plurality of computers.

The communication interface 31 has an interface circuit for connecting the server 3 to a communication network, and enables communication between the server 3 and the outside of the server 3. The communication interface 31 is one example of a communication unit of the server 3.

The storage device 32 includes, for example, a hard disk drive (HDD), a solid state drive (SDD) or an optical recording medium, as well as an access device thereof. The storage device 32 stores various data, for example, information on the bus 2 used for user transportation, a computer program for the processor 34 to execute various processes, and the like. The storage device 32 is one example of a storage unit of the server 3.

The memory 33 has a non-volatile semiconductor memory (for example, RAM). The memory 33 temporarily stores various data used when various processes are executed by the processor 34, for example. The memory 33 is one example of a storage unit of the server 3.

The processor 34 has one or more CPUs and peripheral circuits thereof, and executes various processes. The processor 34 may further include another arithmetic circuit such as a logical operation unit, a numerical operation unit, or a graphic processing unit.

Figure 4:
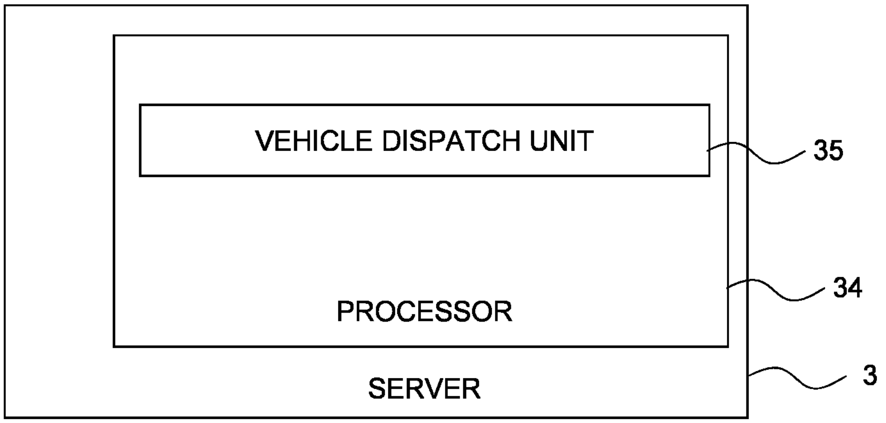
FIG. 4 is a functional block diagram illustrating a processor in a server according to a first embodiment.

FIG. 4 is a functional block diagram illustrating the processor 34 in the server 3 according to the first embodiment. In the present embodiment, the processor 34 has a vehicle dispatch unit 35. The vehicle dispatch unit 35 is a functional module implemented by the processor 34 of the server 3 executing a computer program stored in the storage device 32 of the server 3. The vehicle dispatch unit 35 may be implemented by a dedicated arithmetic circuit provided in the processor 34.

Therefore, in the present embodiment, several classes of buses having different states of a specific amenity will be prepared. However, the desired class of bus varies depending on the user. A proportion of users who desire to board a specific class of bus varies depending on the external environment. Therefore, the vehicle dispatch unit 35 determines, based on external environment information, a ratio between various classes of in-service buses having different states of a specific amenity. With this configuration, it is possible to enable appropriate dispatch of several classes of buses with different states of a specific amenity according to the needs of users.

Figure 5:
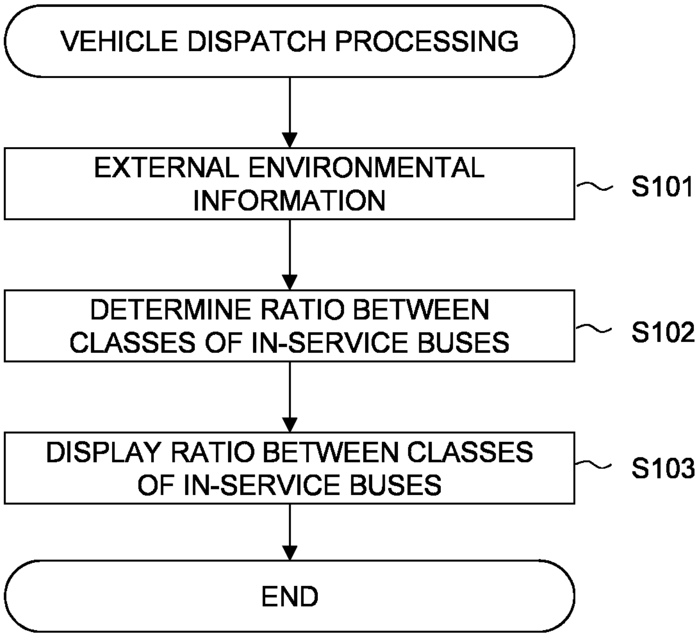
FIG. 5 is a flowchart illustrating a control routine of vehicle dispatch processing according to the first embodiment of the present disclosure.

FIG. 5 is a flowchart illustrating a control routine of vehicle dispatch processing according to the first embodiment of the present disclosure. This control routine is repeatedly executed by the processor 34 of the server 3 at predetermined execution intervals.

First, the vehicle dispatch unit 35 acquires the external environment information in step S101. For example, the vehicle dispatch unit 35 acquires the external environment information by accessing a website that transmits predetermined information via the communication network. The vehicle dispatch unit 35 may acquire the external environment information by receiving the external environment information from the outside of the server 3 via the communication network. Further, the vehicle dispatch unit 35 may acquire the external environment information by reading information input to the server 3 by, for example, an operator of the server 3. In a case where the specific amenity is the pollen remover, the external environmental information is, for example, an amount of pollen dispersed in an area (municipalities, prefectures, etc.) including the service route of the bus 2.

The vehicle dispatch unit 35 determines, based on the external environment information, the ratio between the various classes of in-service buses having different states of a specific amenity, in step S102. For example, the vehicle dispatch unit 35 determines the ratio between the classes of in-service buses based on the external environmental information using a map or calculation formula. In a case where the specific amenity is the pollen remover, the map or calculation formula is created such that the larger the amount of pollen dispersed, the higher the proportion of the buses of the first class provided with the pollen remover.

The vehicle dispatch unit 35 displays the ratio of the number of in-service buses having the specific amenity to the number of in-service buses not having the specific amenity in step S103. For example, the ratio between the classes of in-service buses determined in step S102 is displayed on an output device in the server 3 or outside the server 3. This control routine ends after step S103.

The operator of the transportation service causes the bus 2 to depart from the bus dispatch center 1 according to a service schedule such that the ratio between the classes of in-service buses determined by the vehicle dispatch unit 35 is implemented. For example, in a case where the ratio of the number of buses of the first class to the number of buses of the second class is one to one, the buses of the first class and the buses of the second class will be operated alternately such that the number of the buses of the first class and the number of the buses of the second class traveling on the same route per day are the same. In a case where there is a plurality of service routes, the class of the bus 2 to depart is selected such that the ratio between the classes of in-service buses determined by the vehicle dispatch unit 35 is implemented in each of the plurality of service routes. The ratio between the classes of in-service buses is set, for example, every day. The ratio between the classes of in-service buses may be changed according to the time zone.

Further, the specific amenity provided in the bus 2 may be an amenity other than the pollen remover. For example, the specific amenity may be an infectious disease control device configured to reduce the risk of disease infection. In this case, the external environmental information is, for example, the number of confirmed cases of the disease per predetermined period (for example, one day, one week, etc.) in a specific area (municipalities, prefectures, etc.) including the service route of the bus 2.

Figure 6:
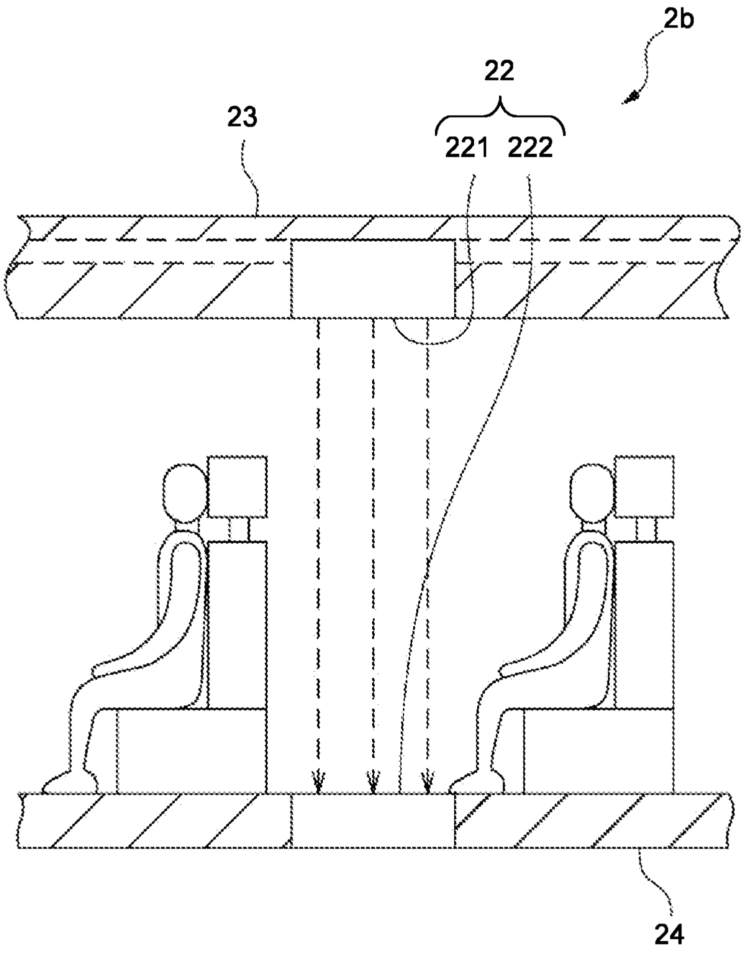
FIG. 6 is a diagram schematically illustrating one example of a bus provided with an infectious disease control device.

FIG. 6 is a diagram schematically illustrating one example of a bus provided with the infectious disease control device. In the bus 2*b* shown in FIG. 6, an air flow generator 22 is used as the infectious disease control device. The air flow generator 22 generates an air flow from a ceiling portion 23 of the bus 2*b* to a floor portion 24 of the bus 2*b* between front and rear seats, as indicated by broken line arrows. That is, the air flow generator 22 creates an air curtain between the users sitting in the front and rear seats. Therefore, it is possible to block the user's exhalation and the flow of airborne droplets within the vehicle compartment of the bus 2*b*. In the example of FIG. 6, the air flow generator 22 is a so-called push-pull ventilation device, which includes a blower device 221 that blows air into the vehicle compartment and an exhaust device 222 that sucks and exhausts the air blown out by the blower device 221. As the infectious disease control device, a ventilation device that ventilates the vehicle compartment of the bus may be also used.

Further, the specific amenity may be a rain visor that expands and contracts in connection with a bus door, as described in Japanese Unexamined Patent Application Publication No. 2005-112321. In this case, the external environmental information is, for example, the chance of precipitation for a service day or service time in an area (municipalities, prefectures) including the service route of the bus 2.

Several classes of buses having specific amenities in different settings may be adopted as the bus 2 used for the transportation service. For example, when the specific amenity is an air conditioner, a plurality of classes of buses having different inside temperatures (e.g. three classes: lightly air-conditioned, moderately air-conditioned, and strongly air-conditioned) are arranged. In this case, the external environmental information is, for example, the expected average temperature for a service day or service time in an area (municipalities, prefectures) including the service route of the bus 2.

Second Embodiment

Configuration and control of a bus dispatch device according to a second embodiment are basically the same as the configuration and control of the bus dispatch device according to the first embodiment, except for the features described below. Hereinafter, the second embodiment of the present disclosure will be described focusing on the features that are distinct from the first embodiment.

In the second embodiment, the vehicle dispatch unit 35 calculates a predetermined parameter using a classifier, which is learned in advance to output the predetermined parameter from the external environment information, and based on the parameter, determines a ratio between various classes of in-service buses, each of which has a different state of the specific amenity, for example, a ratio of the number of in-service buses of the first class to the number of in-service buses of the second class. Consequently, the ratio between the classes of in-service buses can be set more appropriately according to the needs of the user. Examples of such classifiers include machine learning models such as neural networks, support vector machines, and random forests.

Figure 7:
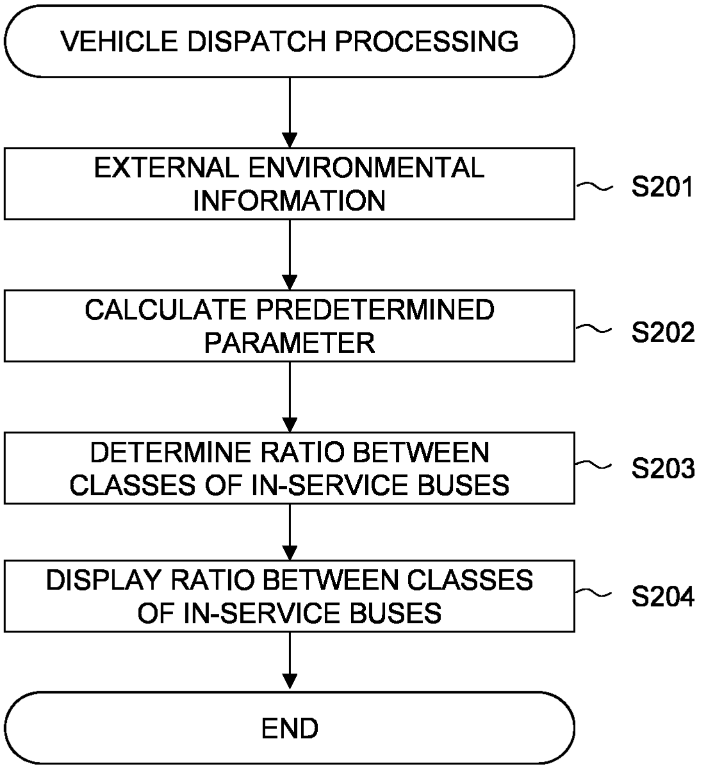
FIG. 7 is a flowchart illustrating a control routine of vehicle dispatch processing according to a second embodiment of the present disclosure.

FIG. 7 is a flowchart illustrating a control routine of vehicle dispatch processing according to the second embodiment of the present disclosure. This control routine is repeatedly executed by the processor 34 of the server 3 at predetermined execution intervals.

First, the vehicle dispatch unit 35 acquires the external environment information in step S201, in the same manner as step S101 shown in FIG. 5.

The vehicle dispatch unit 35 calculates a predetermined parameter by inputting the external environmental information into the classifier in step S202. In a case where the specific amenity is the pollen remover, the predetermined parameter is, for example, the expected amount of pollen dispersed on a service day of the bus 2. In this case, the external environmental information input to the classifier includes, for example, the amount of pollen dispersed on the day before the service day, the expected temperature on the service day, the expected wind speed on the service day, and the probability of precipitation on the service day.

The vehicle dispatch unit 35 determines, based on the predetermined parameter, the ratio between the various classes of in-service buses having different states of a specific amenity, in step S203. For example, the vehicle dispatch unit 35 determines the ratio between the classes of in-service buses based on the predetermined parameter using a map or calculation formula. In a case where the specific amenity is the pollen remover, the map or calculation formula is created such that the larger the expected amount of pollen dispersed on the service day, the higher the proportion of the buses of the first class provided with the pollen remover.

The vehicle dispatch unit 35 displays the ratio of the number of in-service buses having the specific amenity to the number of in-service buses not having the specific amenity in step S204, in the same manner as step S103 shown in FIG. 5. This control routine ends after step S204.

In a case where the specific amenity is the infectious disease control device, the predetermined parameter is, for example, the expected confirmed cases on a service day of the bus 2. In this case, the external environmental information input to the classifier includes, for example, the number of confirmed cases in the past (the day before the service day, the past week, or the like), the day of the week of the service day, and the effective reproduction number.

Third Embodiment

Configuration and control of a bus dispatch device according to a third embodiment are basically the same as the configuration and control of the bus dispatch device according to the first embodiment, except for the features described below. Hereinafter, the third embodiment of the present disclosure will be described focusing on the features that are distinct from the first embodiment.

Figure 8:
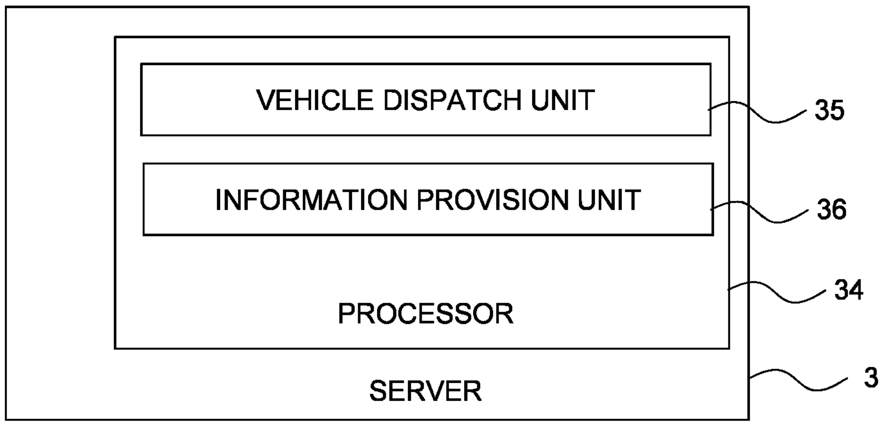
FIG. 8 is a functional block diagram illustrating a processor in a server according to a third embodiment.

FIG. 8 is a functional block diagram illustrating the processor 34 in the server 3 according to the third embodiment. In the present embodiment, the processor 34 has the vehicle dispatch unit 35 and an information provision unit 36. The vehicle dispatch unit 35 and the information provision unit 36 are functional modules implemented by the processor 34 of the server 3 executing a computer program stored in the storage device 32 of the server 3. The vehicle dispatch unit 35 and the information provision unit 36 may be implemented by a dedicated arithmetic circuit provided in the processor 34.

As stated above, the vehicle dispatch unit 35 determines a ratio between the various classes of in-service buses having different states of a specific amenity. On the other hand, the information provision unit 36 provides the user with information on a state of a specific amenity (hereinafter referred to as "amenity information") for the in-service bus. The amenity information is information indicating whether the bus has the specific amenity and how the specific amenity is set. By providing the amenity information to the user, the user can easily select their desired class of bus, and the transportation service can offer further enhanced convenience.

Figure 9:
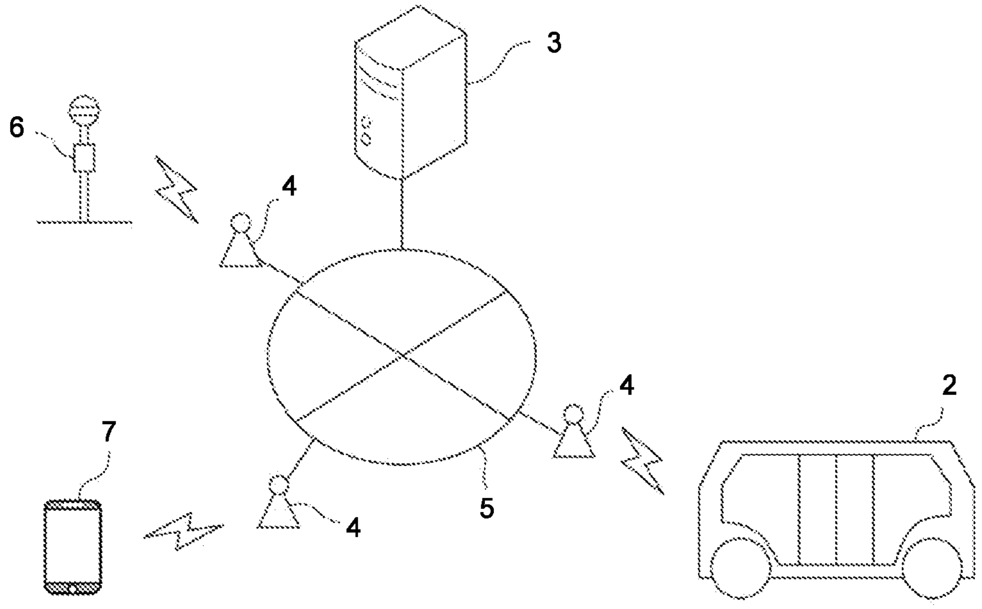
FIG. 9 is a diagram schematically illustrating communication established between the server and the outside of the server.

FIG. 9 is a diagram schematically illustrating communication established between the server 3 and the outside of the server 3. The server 3 can communicate with a plurality of buses 2, a display device 6 provided at a bus stop, and a user terminal 7 of the user via a communication network 5 and a wireless base station 4. The plurality of buses 2, the display device 6, and the user terminal 7 may respectively be directly connected to the communication network 5, not via the wireless base station 4.

The display device 6 includes a communication device, a display, a control unit (processor), and the like, which is configured as, for example, a general-purpose computer. The display device 6 is arranged at each bus stop on the service route, and displays in-service bus information based on a command from the server 3. Therefore, the user at the bus stop can acquire the information by looking at the display device 6. That is, the information provision unit 36 of the server 3 presents the amenity information for the in-service bus to the user via the display device 6.

The user terminal 7 may be, for example, a smartphone, a tablet terminal, a personal computer, or the like, which is operated by the user. The user terminal 7 includes an input unit such as an operation button or a touchscreen, as well as an output unit such as a display. The information provision unit 36 of the server 3 transmits the in-service bus information to the user terminal 7 upon a user's request. That is, the information provision unit 36 of the server 3 presents the amenity information for the in-service bus to the user via the user terminal 7.

Figure 10:
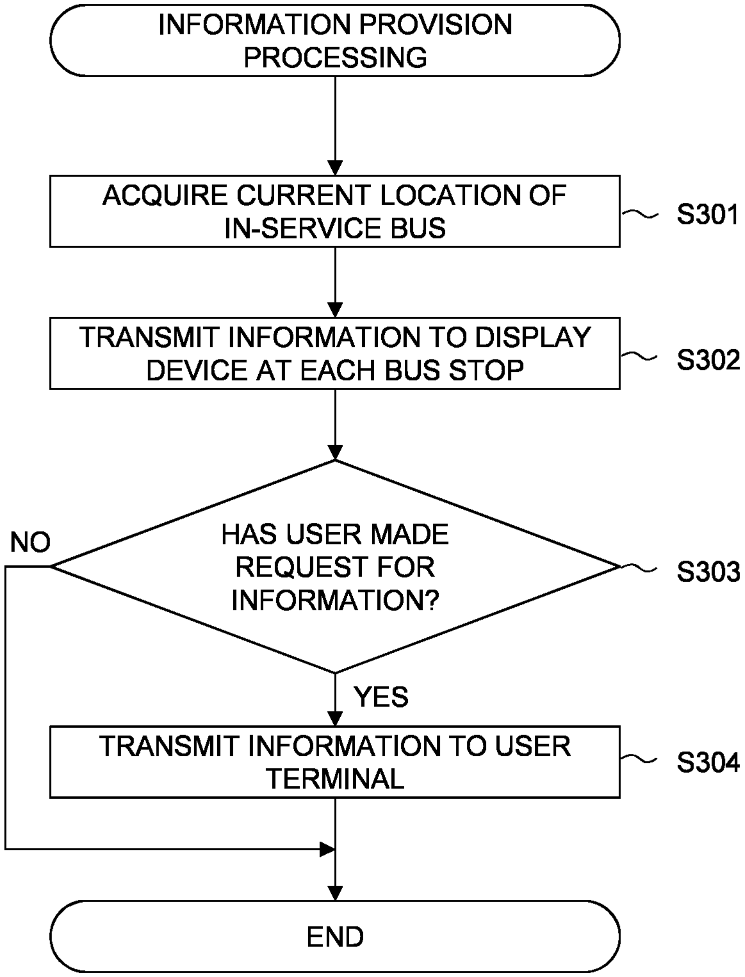
FIG. 10 is a flowchart illustrating a control routine of information provision processing according to the third embodiment of the present disclosure.

FIG. 10 is a flowchart illustrating a control routine of information provision processing according to the third embodiment of the present disclosure. This control routine is repeatedly executed by the processor 34 of the server 3 at predetermined execution intervals.

The information provision unit 36 acquires a current location of the in-service bus 2, that is, the current location of the bus 2 traveling on the service route in step S301. The current location of the in-service bus 2 is detected by, for example, a GPS receiver provided on the bus 2, and is periodically transmitted from the bus 2 to the server 3 via the wireless base station 4 and the communication network 5.

The information provision unit 36 transmits the information on the in-service bus 2 to the display device 6 provided at each bus stop on the service route via the communication network 5 and the wireless base station 4 in step S302. The information includes the estimated time of arrival of the next bus 2 arriving at the bus stop, the amenity information, and the like. When the display device 6 receives the information from the server 3, the display device 6 displays the information on the display of the display device 6. Therefore, the information displayed on the display device 6 of each bus stop is periodically updated by communication with the server 3.

The information provision unit 36 determines whether the user has made a request for the information on the in-service bus in step S303. The user operates the user terminal 7 to request the information, and an information request notification is transmitted from the user terminal 7 to the server 3. For example, the user selects the desired information by designating a bus stop or bus on a map displayed on a transportation service application.

In a case where it is determined that the user has not made a request for the information in step S303, this control routine ends. On the other hand, in a case where that it is determined that the user has made a request for the information in step S303, this control routine proceeds to step S304.

The information provision unit 36 transmits the information on the in-service bus 2 to the user terminal 7 via the communication network 5 and the wireless base station 4 in step S304. In a case where the bus stop is designated by the user, the information provision unit 36 transmits to the user terminal 7 the estimated time of arrival of the bus 2 arriving at the bus stop, the amenity information, and the like. On the other hand, in a case where the in-service bus is designated by the user, the information provision unit 36 transmits, for example, the amenity information of such a bus to the user terminal 7. The information transmitted to the user terminal 7 is displayed on the user terminal 7 and presented to the user via the user terminal 7. This control routine ends after step S304.

The user may acquire information about the in-service bus by accessing a transportation service website via the user terminal 7. In this case, the information provision unit 36 periodically updates the information displayed on the transportation service website based on the current location of the in-service bus 2 and the like.

Other Embodiments

Although the embodiments of the present disclosure have been described above, the present disclosure is not limited to these embodiments, and various modifications can be made within the scope of the claims. For example, the specific amenity may be detachable from the bus 2, and the specific amenity may be installed on the bus 2 according to the ratio between the classes of in-service buses 2 determined by the vehicle dispatch unit 35.

Further, the bus 2 used for the transportation service may be an autonomous vehicle in which some or all of acceleration, steering, and deceleration (braking) of the bus 2 is automatically controlled. Further, an articulated bus in which a plurality of buses are connected may be used for the transportation service, and several classes of buses having different states of a specific amenity may be used as constituent vehicles of the articulated bus. For example, if the ratio of the number of buses of the first class to the number of buses of the second class, determined by the vehicle dispatch unit 35, is one to one, a bus of the first class and a bus of the second class may be used to constitute an articulated bus consisting of two buses.

Further, the fare of the bus of the first class provided with the specific amenity may be set higher than the fare of the bus of the second class not provided with the specific amenity. Further, in a case where the user lets the bus of the first class go by without boarding at the bus stop, the fare for this user may be reduced.

Further, the computer program for causing the computer to execute the functions of each unit of the processor 34 in the server 3 may be provided in a form stored in a recording medium readable by the computer. The computer-readable recording medium may be, for example, a magnetic recording medium, an optical recording medium, or a semiconductor memory.

Further, the embodiments stated above can be implemented in any combination. For example, the control routine of FIG. 10 of the third embodiment may be integrated in the second embodiment.

What is claimed is:

1. A bus dispatch device comprising:

a vehicle dispatch unit configured to determine, based on external environment information, a ratio between various classes of in-service buses having different states of a specific amenity.

2. The bus dispatch device according to claim 1, further comprising:

an information provision unit configured to provide a user with information on a state of the specific amenity for the in-service bus.

3. The bus dispatch device according to claim 2, wherein the information provision unit is configured to provide the information to the user through a display device installed at a bus stop.

4. The bus dispatch device according to claim 2, wherein the information provision unit is configured to provide the information to the user through a user terminal owned by the user.

5. The bus dispatch device according to claim 1, wherein the vehicle dispatch unit is configured to determine a ratio of the number of in-service buses of a first class having the specific amenity to the number of in-service buses of a second class not having the specific amenity, based on the external environment information.

6. The bus dispatch device according to claim 1, wherein the vehicle dispatch unit is configured to calculate a predetermined parameter using a classifier, which is learned in advance to output the predetermined parameter from the external environment information, and based on the predetermined parameter, to determine the ratio between the various classes of in-service buses having different states of the specific amenity.

7. A bus dispatch method comprising:

determining, based on external environment information, a ratio between various classes of in-service buses having different states of a specific amenity.

8. A bus dispatch computer program causing a computer to execute:

determining, based on external environment information, a ratio between various classes of in-service buses having different states of a specific amenity.

* * * * *